July 1, 1958 — B. H. MALMGREN — 2,841,271
CONVEYOR IDLERS
Filed July 18, 1955
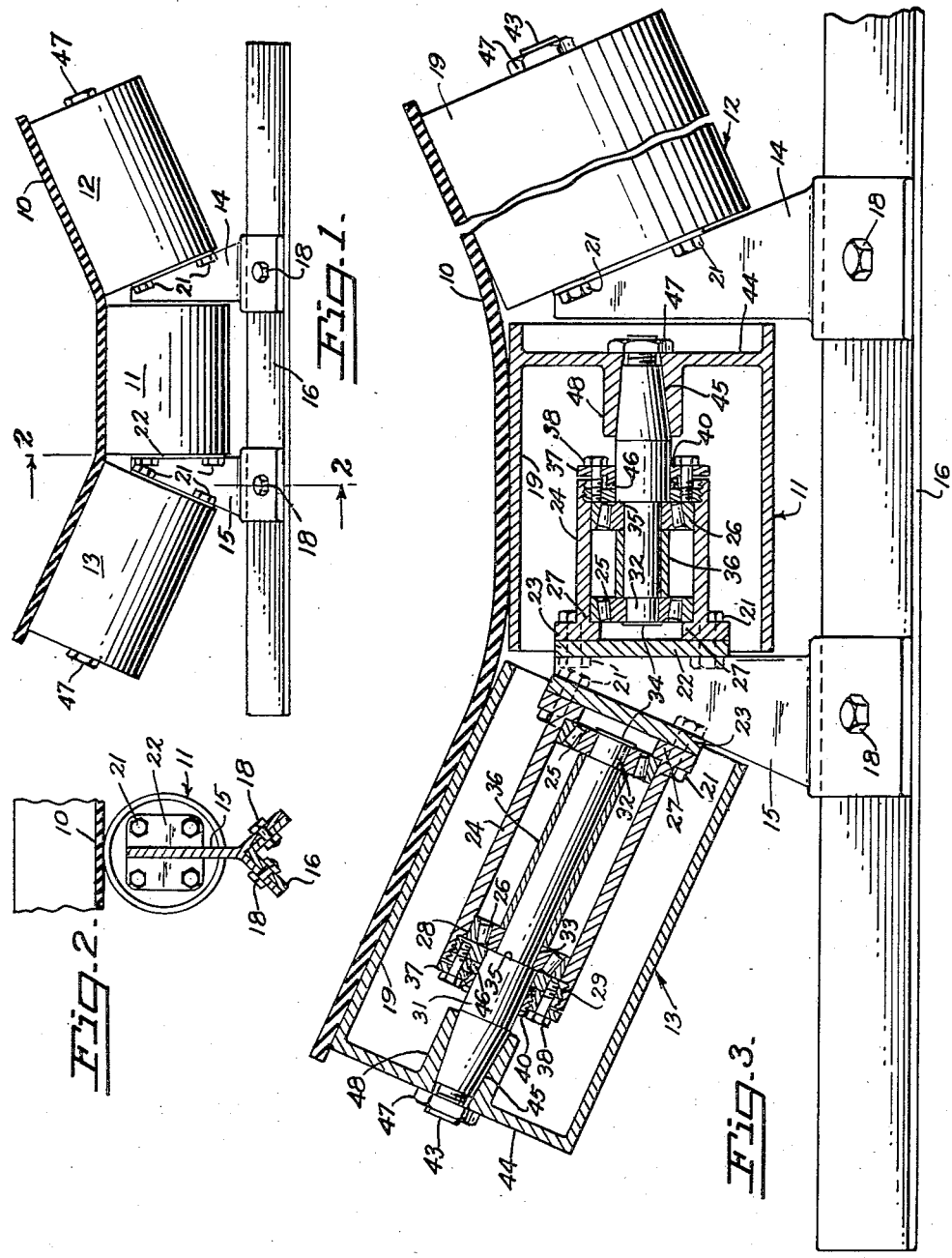
INVENTOR.
BROR H. MALMGREN
BY
Townsend, Townsend and Hoppe
ATTORNEYS

United States Patent Office 2,841,271
Patented July 1, 1958

2,841,271

CONVEYOR IDLERS

Bror H. Malmgren, Petaluma, Calif.

Application July 18, 1955, Serial No. 522,692

1 Claim. (Cl. 198—192)

This invention relates to conveyors and more specifically to idlers for the transport of conveyor belts.

In the transportation of materials from point to point belts are commonly employed which travel over an array of three idlers at frequent intervals. One idler is oriented horizontally and the other two are arranged on either side thereof in an angular relation to fold the belt inwardly therein forming a V-shaped surface or trough, so that material carried on the belt will be directed toward the center portion of the carrier. This type of conveyor is commonly used in the transport of mineral ore, rock, sand and aggregate and often traverses distances of many miles over rugged terrain. Commonly each idler is supported by an axle which is, in turn, suspended from a standard on either side of the axle. This type of arrangement has exhibited difficulties relating to the bearings and support structure for the idlers because of damage from dirt and water finding its way into the bearings. The cost and difficulty of maintenance has been a major problem in trough conveyors.

Accordingly, an object of this invention is to provide a conveyor belt idler assembly which is particularly well protected from dirt or water and like exposure.

Another object of the invention is to provide an improved conveyor belt idler.

A further object of the invention is to provide an idler assembly in which each idler is supported from a single standard.

Another object of the invention is to provide an idler in which an axle is integral with an idler drum and the axle is supported from a housing integral with a single standard.

Yet still a further object is to provide a cross-sectional support for a conveyor belt which has three idler drums each supported from a housing attached to a standard by a shaft which is rotatably supported from within the housing.

The above and other objects and advantages of my invention will best be understood by referring to the following detailed specification of certain selected and preferred embodiments thereof chosen by way of illustration and not limitation and by a like reference to the accompanying drawings forming a part hereof;

Fig. 1 is a side view of a preferred embodiment of the invention.

Fig. 2 is an end view of the embodiment of Fig. 1 taken at line 2—2.

Fig. 3 is a longitudinal sectional view of the embodiment of Fig. 1.

In Figs. 1 and 2 a belt 10 is supported upon a central idler 11, a right idler 12, and a left idler 13. A right standard 14 is provided to support the idler 12 and a left standard 15 is provided to support the two idlers 11 and 13. Each idler is provided with a drum 19 which is journaled from a housing supported from the standards 14 and 15 as is hereinafter explained in connection with Fig. 3. The right idler 12 and the left idler 13 have a central axis in a linear relation to each other and the central idler 11 which extends upwardly in an angular departure from the central axis of the central idler 11. This forms a valley or V shape surface for the belt 10 to ride upon. The standards 14 and 15 are mounted to a supporting member beam 16 from a bracket 17 which is integral with the standards. Bolts 18 attach the bracket 17 to the beam 16. Both the bracket 17 and the beam 16 are in the shape of an inverted V to provide greater support for the standards 14 and 15.

In Fig. 3, the three idlers 11, 12, and 13, are of identical construction though idler 11 is shorter than the adjacent idlers, and the common reference numbers are indicated for similar components of each idler. The central idler 11 is supported from the left standard 14 by bolts 21 which pass through holes in a lip 22 of the standard 14 to affix a complementary lip 23 of a housing 24 thereto. The housing 24 is in the form of an elongated hollow tube, which is adapted to support a bearing 25 and a bearing 26. The bearing 25 rests in a bearing cap 27 on an inner portion of the housing 24 against an inner extension of the lip 23. The bearing 26 rests in a similar bearing cap 28 on the opposite end of the housing 24 against a bearing support plate 29 which is engaged threadably with the housing in threads provided in the end thereof.

An axle or shaft 31 is provided with a bearing face 32 which is arranged to engage with the bearing 25. The shaft 31 is also provided with a bearing face 33 further along on the shaft which is arranged to engage with the bearing 26. The shaft 31 is provided with an offset 34 to hold the bearing face 32 onto the shaft 31, and also has a lip 35 which holds the bearing face 33 from outward movement and a spacer or sleeve 36 around the shaft 31 to bias the bearing faces 32 and 33 against the offset 34 and the lip 35 respectively. The shaft 31 is thus journaled from the housing 24 by the bearings 25 and 26.

The extreme end of the housing 24 is provided with a lock plate 37 which is held to the housing 24 by bolts 38 which screw into holes in the bearing support plate 29. The support plate 29 has an opening to allow the shaft 31 to pass therethrough which allows only sufficient clearance of the shaft 31 so as not to offer impedance thereto.

A gland 40 is mounted concentric to the shaft 31 and is interposed between the lock plate 37 and the shaft 31 and a packing or seal 46 is arranged around the shaft 31 to seal the shaft 31 in the spacing between the gland 39 and the support plate 29 from foreign matter.

The extreme end of the shaft 31 is tapered and ends in threaded section 43. The drum or shell 19 is in the shape of a cylinder with one end open and the other end provided with an end plate 44 that has a central opening with an inner lip 45. The lip 45 has an inside taper formed as a cone that is complementary to the taper of the shaft 31 so the lip 45 can be fitted over the tapered section of the shaft 31. The drum 19 is mounted on the shaft 31 and is held thereon by a nut 47 applying force between the tapered section of the shaft 31 and the lip 45. The idlers 12 and 13 are of similar construction but supported from lips 48 on the standards 14 and 15 which are disposed in a predetermined angular relation to obtain the desired valley-shaped top surface. The three drums are thus supported from only the two standards 14 and 15 to form a valley upon which the belt 10 may conveniently ride. The bearings 25 and 26 function to rotatably support the shaft 31 so that the drums 19 may readily rotate about their respective housings 24 without additional support. The end plate 44 of the drums 19 provides an obstruction to dirt, water or other damaging matter. Even should such damaging matter find its way beyond the plate 44, the seal 46 offers a second obstruction therein affording even greater bearing protection.

It is apparent that dirt or water seeking access to the bearings through the exposed elevated ends of idlers 12 and 13 can not enter into the area of the bearings 25 and 26. The bearings are protected from foreign matter because of the unique construction of this device and, therefore, if the bearings are of the permanent lubrication type there should be no need for further lubrication or cleaning during the useful life of the device.

It will be understood that this invention is not limited to the specific embodiments herein illustrated and described and that the following claim is intended to cover all changes and modifications which do not depart from the spirit and the true scope of the invention.

What is claimed is:

An idler assembly having a standard, a housing means rigidly supported by said standard, a first bearing means and a second bearing means carried within said housing means, a shaft having a first portion rotatably supported from within said housing means by said first bearing means and a second end portion rotatably supported from within said housing by said second bearing means, means to hold said first and second bearing means in a fixed spaced apart position on said shaft comprising an offset on said first portion of said shaft adjacent the otuer edge of said first bearing means, a removable lip on said second portion of said shaft positioned adjacent the outer edge of said second bearing means, a sleeve around said shaft between said first and second bearing means to hold said first bearing means against said offset and said second bearing means against said lip, bearing retaining means secured to said housing means to hold said first and second bearing means within said housing means with said shaft in spaced relation from all portions of said housing means, locking means attached to an end of said housing means to secure said bearing retaining means to said housing means, sealing means disposed around said shaft between said bearing retaining means and said locking means to protect said first and second bearing means from matter outside said housing means, a drum having a closed end with an inwardly flanged cone in the central portion, the cone of said drum being secured against a tapered portion of a second end of said shaft, and means to hold said drum secured to said shaft.

References Cited in the file of this patent

UNITED STATES PATENTS

| 699,477 | Bee | May 6, 1902 |
| 702,273 | Acklin | June 10, 1902 |
| 1,156,386 | Armstrong | Oct. 12, 1915 |

FOREIGN PATENTS

| 622,260 | Germany | Nov. 23, 1935 |